United States Patent [19]
Schilit et al.

[11] Patent Number: 5,627,980
[45] Date of Patent: May 6, 1997

[54] ELISION BASED PRESENTATION OF ORDERED DATA

[75] Inventors: William N. Schilit, Palo Alto, Calif.; Michael M. Tso, Beaverton, Oreg.

[73] Assignee: Xerox Corporation, Stamford, Conn.

[21] Appl. No.: 407,459

[22] Filed: Mar. 20, 1995

[51] Int. Cl.$^6$ .................................. G06F 3/00; G06F 3/14
[52] U.S. Cl. .................. 395/353; 395/357; 395/350; 395/354; 345/902
[58] Field of Search ........................... 395/156, 160, 395/159, 157; 345/146, 173, 179, 902

[56] References Cited

U.S. PATENT DOCUMENTS

| | | | |
|---|---|---|---|
| 4,613,946 | 9/1986 | Forman | 395/160 |
| 4,758,977 | 7/1988 | Morimoto et al. | 364/900 |
| 4,899,377 | 2/1990 | Bauer et al. | 345/902 X |
| 5,123,088 | 6/1992 | Kasahara et al. | 395/159 |
| 5,283,864 | 2/1994 | Knowlton | 395/159 X |
| 5,339,390 | 8/1994 | Robertson et al. | 395/157 |
| 5,392,387 | 2/1995 | Fitzpatrick et al. | 395/156 |
| 5,483,651 | 1/1996 | Adams et al. | 395/159 X |
| 5,515,497 | 5/1996 | Itri et al. | 395/159 |

FOREIGN PATENT DOCUMENTS

| | | |
|---|---|---|
| 0453840A3 | 10/1991 | European Pat. Off. . |
| 2145257 | 3/1985 | United Kingdom . |

OTHER PUBLICATIONS

European Search report for counterpart application 96301916.1.
"Notebook Control Cascading Tab Choices," IBM Technical Disclosure Bulletin, vol. 35, No. 4B, 1 Sep. 1992, pp. 284–286.
R. Want et al., "An Overview of the Parctab Ubiquitous Computing Experiment," IEEE Personal Communications, vol. 2, No. 6, 1 Dec. 1995, pp. 28–43.

*Primary Examiner*—Raymond J. Bayerl
*Attorney, Agent, or Firm*—Robert A. Burtzlaff

[57] ABSTRACT

A method for accessing members of an ordered data set includes a procedure for dividing an ordered data set into multiple ordered subsets, designating at least one member of each ordered subset as a bracket member, referencing those members of each ordered subset not identified as bracket members with a collective data member symbol, and displaying an ordered set of bracket members, with a collective data member symbol such as an ellipsis displayed between those bracket members separated from each other by two or more members in the ordered data set. Upon user selection of the ellipsis, this procedure is repeated, with those members of each ordered subset not identified as bracket members, and arranged between a respective pair of bracket members, constituting a new ordered data set capable of being divided into multiple ordered subsets. In effect, this method references data not shown on a display screen through designation with an ellipsis, and advantageously allows access to large sets of ordered data even with a physically small display device or computer.

33 Claims, 14 Drawing Sheets

ELISION BASED PRESENTATION OF ORDERED DATA

The present invention relates generally to a graphical interface for data presentation by a computer user. More particularly, the present invention relates to a space efficient, elision based menu system for presenting data that is suitable for use in visual displays of limited size.

BACKGROUND AND SUMMARY OF THE INVENTION

The use of menu based selection systems for user control of software systems is widely practiced. Menu selection with simple key presses or pointing devices (such as a touchpad or a mouse) eliminates training and memorization of complex command sequences, and can impart information not otherwise readily available to a user. Menus can be used to access information, or for initiation of actions that control software and hardware. Because of their ease of use as compared to command line instructions, pull-down or pop-up menus such as those first employed in the Xerox Star computer have been widely adopted by the computer industry.

However, menu systems are not without disadvantages. Organization of large menu systems suited for use by an inexperienced user can be difficult. If too many menu options are available, it is difficult or impossible to simultaneously fit all the menu choices on a screen. In practice, this has led to the development of hierarchical menu systems, usually tree based, that only present information at one level of the tree at a given time. For example, a user can move higher or lower in binary, ternary, or k-ary tree (where k is an integer representing the number of choices at each level of the tree) to select a desired menu option, with only a relatively few choices having to be made by the user at each level.

Unfortunately, design of a easily usable hierarchical tree menu system is not simple. Menu options or data items may logically belong in several different categories, forcing duplication of entries at different levels of the tree. In addition, users can literally become lost or disoriented in the tree structures having large depth (number of levels) and breadth (number of choices, options, or data available at each level). This problem is prticularly acute in systems having limited screen display space. To fit within screen constraints, the menu designer is forced to provide "narrow" trees having little breadth, with a "deep" level structure. This necessary trade-off between depth and breadth is not to the benefit of a user, who often becomes disoriented after proceeding as few as four or five levels down in the tree structure. Even more importantly, having greater depth in a tree structure usually leads to an increase in the number of menu selections required by a user to complete a task, disrupting work flow and greatly irritating the user.

To alleviate the problems associated with tree structures, menu designers have employed a technique commonly known as "scrolling". A scrolling menu presentation shows only a small portion of the complete menu options. In a common type of scrolling window application, a user accesses other menu options by clicking on arrow keys in a scroll bar to rewrite the display with new choices that are alphabetically ordered before or after the currently displayed scrolling window. Although this method reduces disorientation associated with deep trees, the breadth problems associated with selecting one choice in a long list are enhanced. This may require a user to endure multiple screen rewrites to scroll through a long list of menu choices. Even if shortcuts to particular portions of a long list exist (e.g., pointer selection on a scroll bar to move halfway down a list), such shortcuts often require a guess as to where in a list a desired menu option may be found.

Accordingly, the present invention reduces problems associated with ordering data in deep or wide trees, scrollable lists, or other known methods for organizing data structures for presentation to a user by providing a novel elision based method for accessing members of an ordered data set. A selected ordered data set is divided into multiple ordered subsets. These subsets can be of varying size, but typically will contain approximately the same number of members in each ordered subset. At least one member of each ordered subset is then designated as a "bracket" member, with those members of each ordered subset not identified as bracket members referenced with a "collective data member symbol". Normally, either the highest or the lowest member in the ordered subset is selected to be a bracket member, and an ellipsis ". . ." is used as the collective data member symbol. The ordered set of bracket members is then displayed, with a collective data member symbol also displayed between those bracket members separated from each other by two or more members in the ordered data set.

For example, a display showing integers between 1 and a 100, with an initial four ordered subsets, would appear as "1 . . . 25 . . . 50 . . . 75 . . . 100". A user can select one of the displayed bracket members (1, 25, 50, 75, 100) to obtain more information about that bracket member, or initiate performance of an operation associated with that bracket member.

If a user does not need to select one of the displayed bracket members (1, 25, 50, 75, 100), other data members can be easily accessed by selecting an appropriate ellipsis. In a substantially recursive manner, the foregoing steps of the method of the present invention are repeated. Those members of each ordered subset not identified as bracket members, and arranged between a respective pair of bracket members (i.e., referenced with an ellipsis), constitute a new ordered data set capable of being divided into multiple ordered subsets. Ordinarily, the method of the present invention repeats itself until a user selects a bracket member, or alternatively invokes a call to escape the program.

As an example, consider that selection of the ellipsis between the integers 25 and 50 would result in a rewrite of the display to show "1 . . . 25 . . . 30 . . . 35 . . . 40 . . . 45 . . . 50 . . . 100". Note that this displayed sequence permits backing up to the previous level by selecting the ellipsis between 1 and 25, or the ellipsis between 50 and 100. If the desired number is 35, a user can select the number 35 and initiate performance of the desired operation. If the number to be selected instead happened to be 37, the ellipsis between the numbers 35 and 40 is selected, with the rewritten display then showing "1 . . . 35, 36, 37, 38, 39, 40 . . . 100". The user can then select the displayed bracket member 37, and initiate performance of an operation associated with the number 37. Note that the division into subsets in this example is variable, with the ordered data set 1 through 100 divided into four subsets on the display, the next lower level ordered data set of 25 through 50 is divided into five displayed subsets, and the lowest level simply displaying four bracket members (36, 37, 38, and 39) in the subset. Of course, as desired it is possible to select equal subset divisions at all levels. In fact this may present certain advantages, since choosing equal divisions allows for presentation at all levels in a substantially constant area of display screens.

In preferred embodiments, the method of the present invention adapts to the need of a user by preferentially selecting as bracket members those members of the data set determined likely to be selected to perform an operation by the user. This adaptive behavior greatly speeds the user selection process for data, since redrawing a screen based on the ordered subset of data is not required. The selection criteria for determining likelihood of user selection can vary, but may include preferentially selecting as bracket members those members of the ordered data set last selected by a user; preferentially selecting as bracket members those members of the ordered data set most frequently selected by a user; or even preferentially selecting as bracket members certain user determined members of the ordered data set.

In a most preferred embodiment of the present invention, the ordered data set is alphabetically ordered text. However, the data set can be numerically ordered, chronologically ordered, or even provide an order based on discrete measurements of physical quantities. For example, representations of color, hue, gray levels, temperature, area, length, etc., can be ordered in a manner suitable for use in conjunction with the present invention.

Another aspect of the present invention provides a recursive method for accessing members of an ordered data set. An ordered data set is divided into multiple ordered subsets, with an initial or terminal member of each ordered subset designated as a bracket member. Those members of each ordered subset not identified as bracket members are collectively referenced with a collective data member symbol. An ordered set of bracket members is displayed, with a collective data member symbol displayed between those bracket members separated from each other by two or more members in the ordered data set. When a user selects one of the bracket members, an operation is performed.

Yet another aspect of the present invention encompasses an apparatus for accessing members of ordered data sets too large to permit individual display of each member within a predetermined display area. This apparatus includes a display unit having a predetermined area configured to accommodate a defined number of representations of data members, a memory unit for storing ordered data and instruction data, and a user input device for receiving signals indicating selection of a representation of a data member by a user. The user input device can be a keyboard, a touch sensitive pointer, a mouse, or any other conventional selector mechanisms. Typically, the apparatus has a small (often less than 25 square centimeter) screen display, or alternatively can use only a small area of a larger screen display (e.g., a child window display, a pop-up menu, or a pull-down menu on a standard 17-inch CRT display). In fact, utility in conjunction with small screen displays makes the method and apparatus of the present invention ideal for handheld devices, or those devices having little available space or need for a standard large format display screen.

The apparatus also includes a processor connected to receive data from the user input device, with the processor being further connected to the display unit to control display of representations of data members, and to the memory unit to access stored ordered data and instruction data. The processor is configured to execute instructions that provide for dividing an ordered data set stored in the memory unit into multiple ordered subsets, designating at least one member of each ordered subset as a bracket member, and referencing those members of each ordered subset not identified as bracket members with a collective data member symbol. In response to processor instructions, the display unit displays an ordered set of bracket members, with a collective data member symbol displayed between those bracket members separated from each other by two or more members in the ordered data set stored in the memory unit. When a user selects one of the bracket members with a pointing device or other conventional user input device, an operation such as data retrieval or initiation of software or hardware control is performed by the processor.

Other objects and advantages of the present invention will become apparent to those skilled in the art upon consideration of the following description of the drawings and preferred embodiments.

Detailed Description of the Invention

Figure 1:
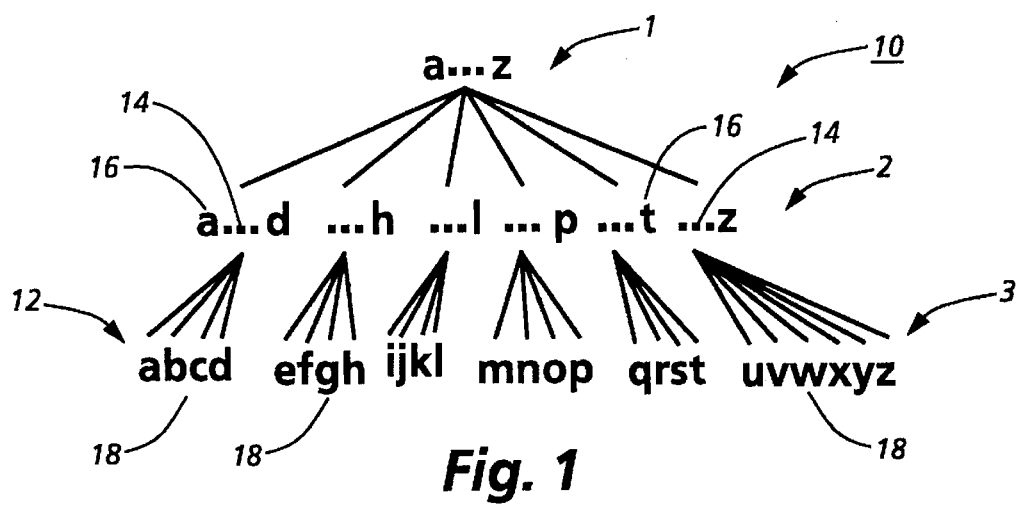
FIG. 1 schematically illustrates one possible k-ary menu tree for representation of letters of the alphabet as an alphabetically ordered data set, with bracket members (letters) separated by an ellipsis acting as collective data member symbol, and three tree levels shown.

As illustrated in FIG. 1, a simple example of a k-ary menu tree 10 having logical structure suitable for use in the method of the present invention has a first level 1, a second level 2, and a third level 3. The third level 3 is composed of twenty-six members representing an alphabetic data set 12. As one would expect, the alphabetic data set 12 is conveniently organized in alphabetical order, with the letter "a" first and the letter "z" last.

The alphabetic data set 12 is divided into six subsets 18, with five of the subsets 18 containing four members each, and the remaining subset containing six members ("uvwxyz"). This is represented at the second level 2 of the k-ary menu tree 10 by the combination of bracket members 16, and a collective data member symbol such as an ellipsis 14 (. . .). The ellipsis 14 represents those members in the subset 18 not displayed at the second level 2 while still being members of the appropriate subset 18 (as indicated by connecting lines in the tree structure). The bracket members 16 are one or more selected members from each subset 18. As shown in FIG. 1, the last member of each subset 18 (d, h, l, p, t, and z) is a bracket member, along with the first member of the entire alphabetic data set 12 (in this case, "a").

Presentation of the k-ary menu tree 10 on a computer processor driven small screen display 20 is illustrated with reference to FIGS. 2 and 3. Because only a limited number of characters can be displayed (in the example, 4×4=16 characters), the entire alphabetic data set 12 with twenty-six members cannot be simultaneously displayed on the screen. Instead, a hierarchical, elision based method of menu presentation that displays selected bracket members (taken from the alphabetic data set 12) and the ellipsis 14 (to represent those omitted characters in order between the bracket members) is used to allow two step selection of any letter.

Figure 2:
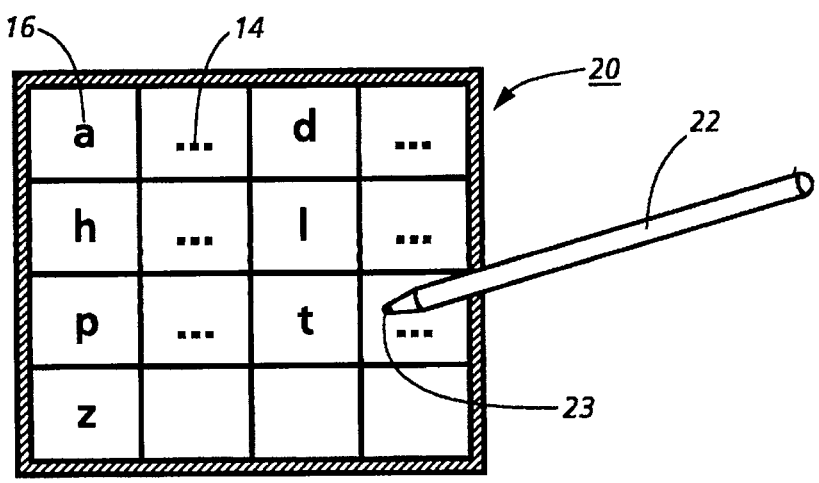
FIG. 2 is a schematic representation of a screen display presenting information related to the second level of the k-ary tree of FIG. 1 within a limited screen space. A touch sensitive pointer is indicating user selection of an ellipsis between the letters "t" and "z"
Figure 3:
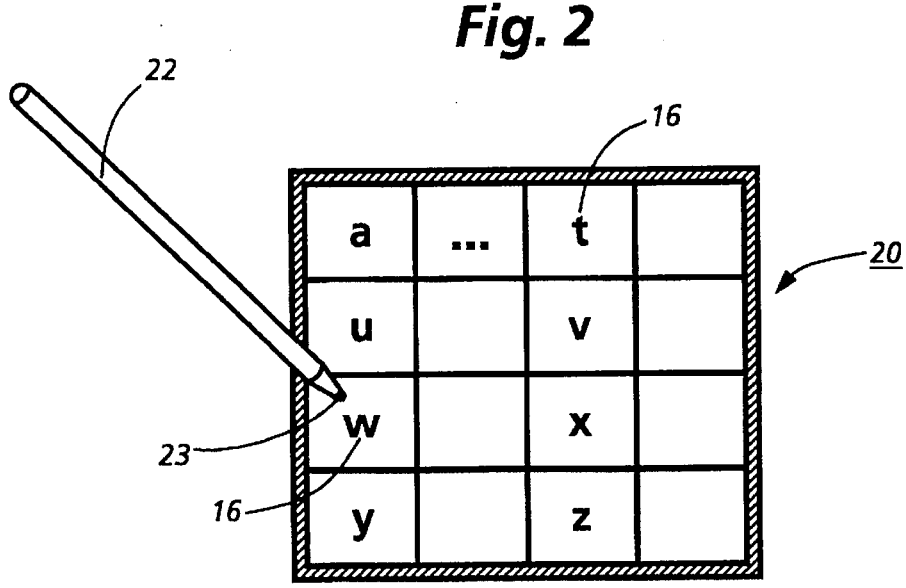
FIG. 3 is a schematic representation of the screen display of FIG. 2 as it has been rewritten in response to user selection of the ellipsis, with the touch sensitive pointer indicating the letter "w" to initiate an action such as retrieval of information related to the letter "w"

In the example shown in FIGS. 2 and 3, a user desires to select the letter "w". As can be seen from inspection of FIG. 2, the letter "w" is not present on the screen. Instead, bracket members 16, separated by an ellipsis 14 are displayed. Since the user realizes that "w" lies between the letters "t" and "z" in conventional alphabetic ordering, the user selects the ellipsis positioned between those characters (reading left to right, top to bottom on the display). Selection is accomplished by bringing the tip 23 of a pointing device 22 into contact with the touch sensitive screen of the display 20. The screen display 20 is then rewritten to appear as shown in FIG. 3, allowing the letter "w" to be selected with the pointing device 22. If the user makes a mistake, and instead had wished to select a letter between "a" and "t", the ellipsis positioned between those respective letters could be touched to back up to the level 2 indicated in FIG. 2.

Figure 4:
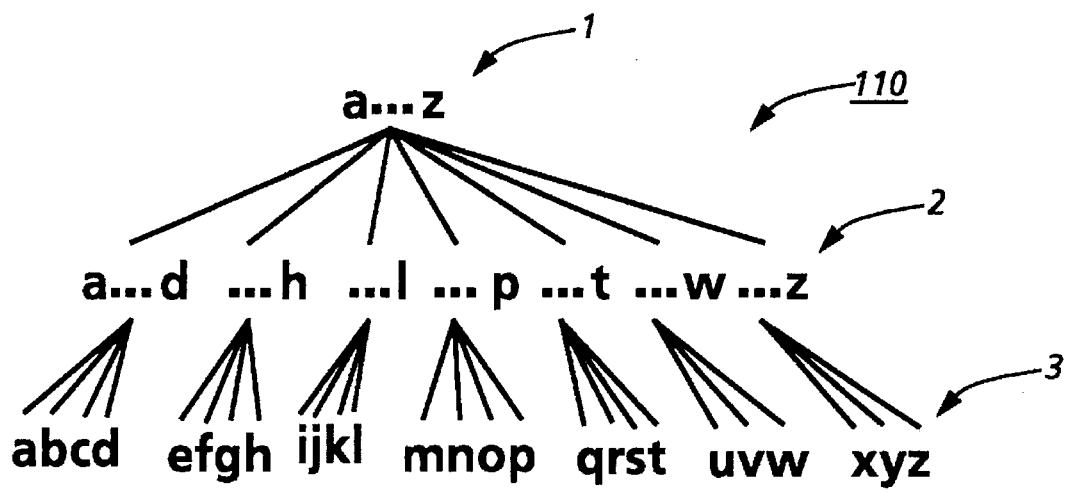
FIG. 4 schematically illustrates adaptive reorganization of the k-ary menu tree shown in FIG. 1 after selection of the letter "w" as shown in FIGS. 2 and 3.
Figure 5:
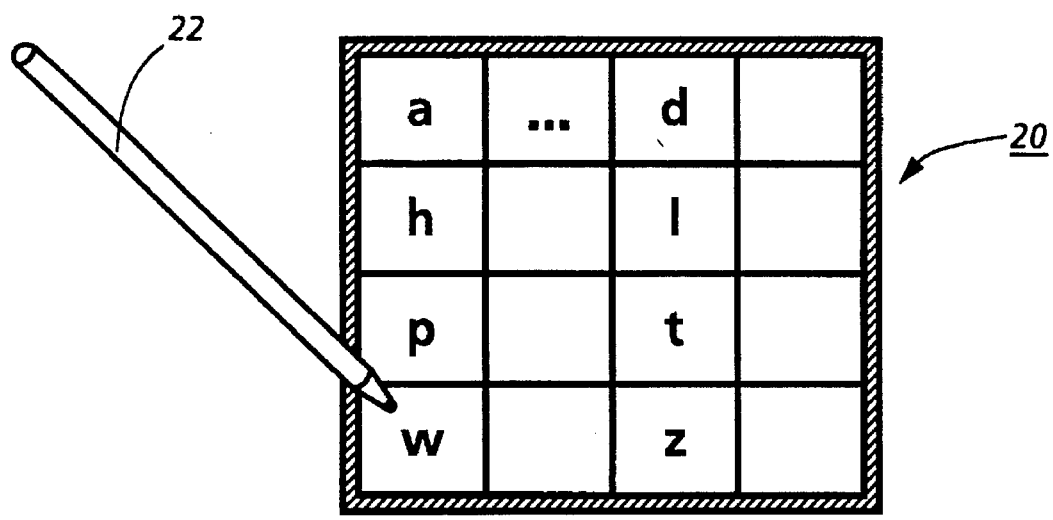
FIG. 5 is a schematic representation of a screen display presenting information related to the second level of the k-ary tree of FIG. 4 within a limited screen space. A touch sensitive pointer is indicating user selection of the letter "w", now designated as a bracket member at the second level of the k-ary tree (contrast with FIG. 1, in which "w" is a bracket member at the third level of the k-ary tree)
Figure 6:
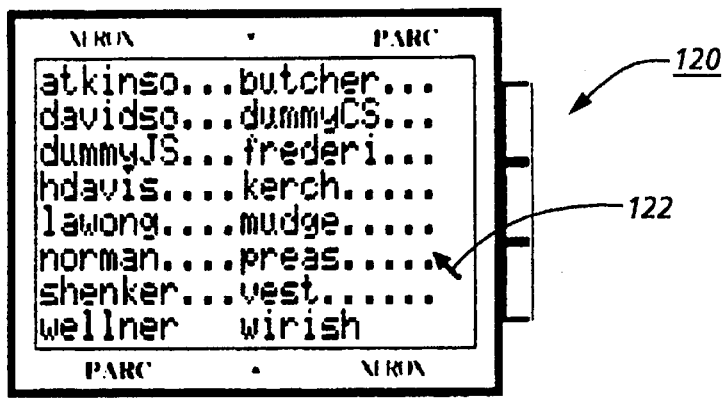
FIG. 6 illustrates a handheld computer having a small screen size that can be used to determine the location of individuals upon selection of an individual's name. A pointing device illustrates selection of an ellipsis between individuals represented by "preas" and "shenker"

A unique adaptive aspect of the present invention is indicated with reference to FIGS. 4 and 5. After user selection of the letter "w", the screen display (shown in FIG. 5) and logical structure of the the k-ary menu tree 110 (shown in FIG. 4) is modified to reflect the increased likelihood that "w" will again be selected. The letter "w" is selected to be a bracket member, causing the subset to which "w" formerly belonged ("uvwxyz") to be subdivided into subsets ("uvw" and "xyz"). Display of the letter "w" as a bracket member on the second level 2 positions that letter on the first screen shown to a user, eliminating the two step selection procedure discussed previously in connection with FIGS. 1, 2, and 3.

As those skilled in the art will appreciate, alternative methods for determining the most likely to be selected members of the data set can also be employed. It is contemplated that methods involving selection of bracket members historically selected with the highest frequency, those members defined as important by the user, or any other accepted selection criteria can be used in the method according to the present invention. In addition, the size of subsets defined by selection of bracket members can be varied, with both equal and unequal divisions of subsets being contemplated (e.g., subsets of the data set 12 could provide for relatively few members in the first portion of the alphabet, "abcd", and many members toward the end, "qrstuvwxyz"). Variable member size of the subsets could be most useful in connection with ordered data sets that have widely varying access requirements within the data set. If the access requirements are unknown, or algorithmically costly to implement, equal division of members into multiple subsets is often adequate.

Figure 7:
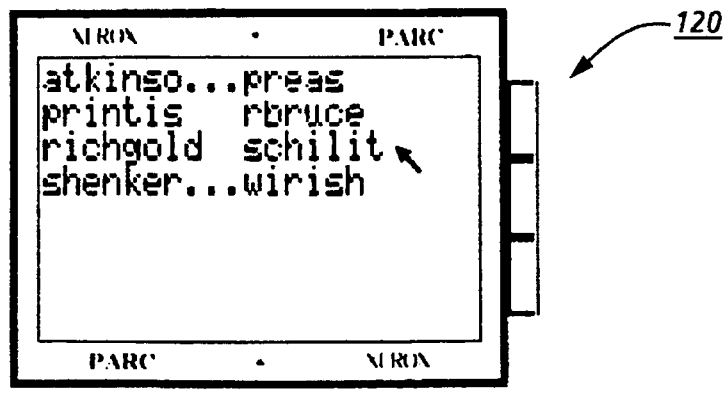
FIG. 7 illustrates the screen of the handheld computer of FIG. 6 after selection of the ellipsis. A pointing device illustrates selection of the name of the present inventor "schilit"
Figure 8:
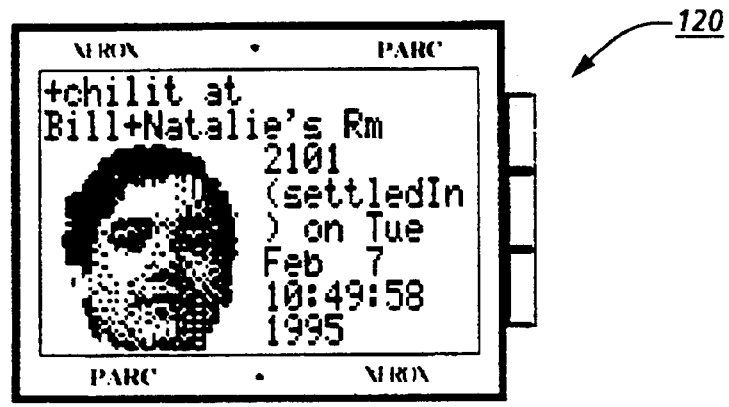
FIG. 8 illustrates the screen of the handheld computer of FIG. 7 after selection of the name "schilit", with information about his location in room 2101 and the time and date being shown.
Figure 9:
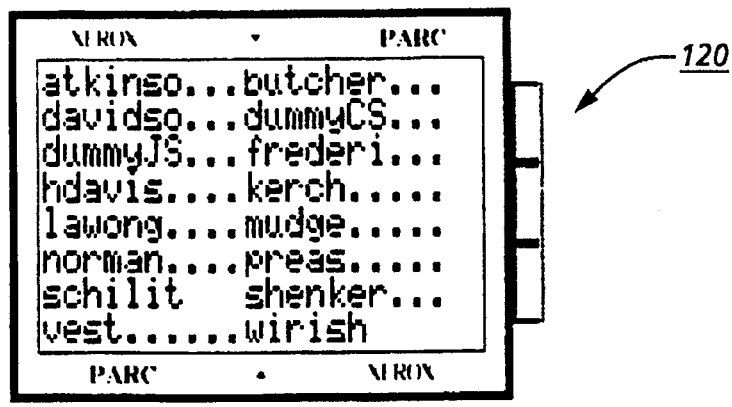
FIG. 9 illustrates the screen of the handheld computer of FIGS. 6–8, with the k-ary tree ordering name data having been adaptively reorganized after the selection of the name "schilit" in FIGS. 7 and 8 to now allow screen presentation of the name "schilit" at the top level of the k-ary tree ordering.
Figure 10:
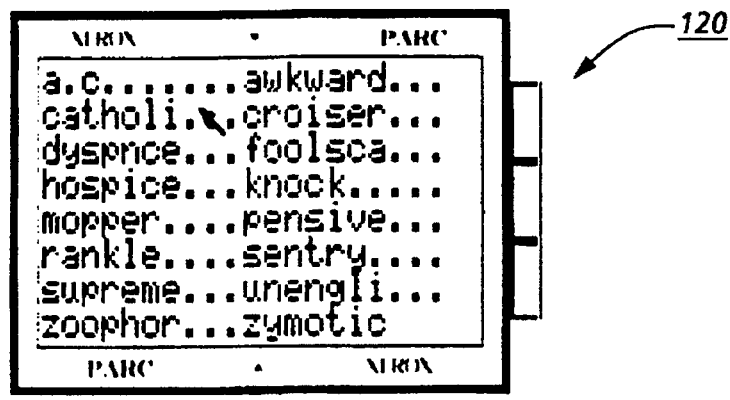
FIGS. 10–14 sequentially illustrate selection of the word "computer" from a thesaurus application capable of running on a handheld computer with a small screen size.
Figure 11:
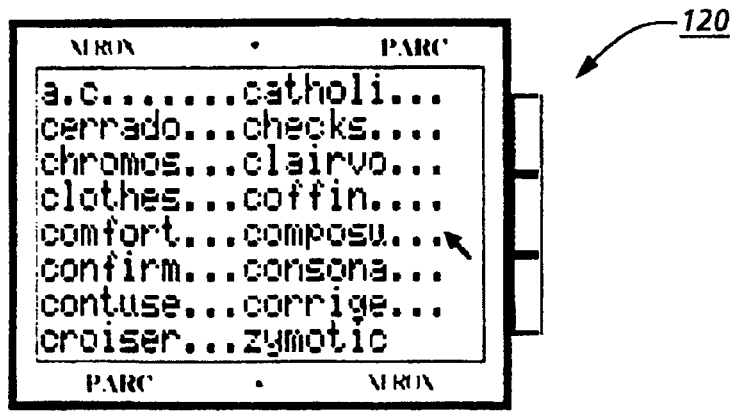
Figure 12:
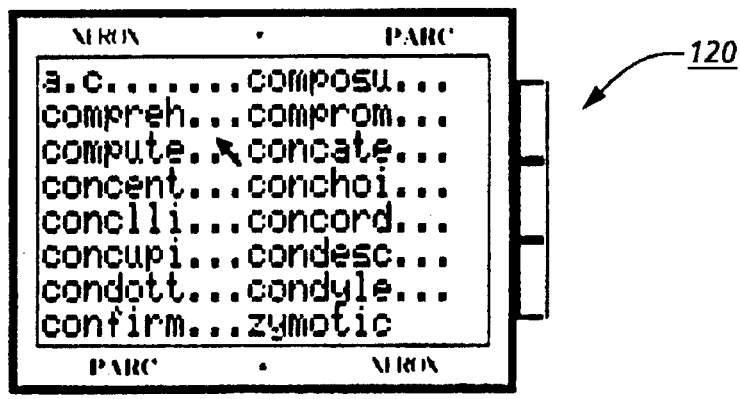
Figure 13:
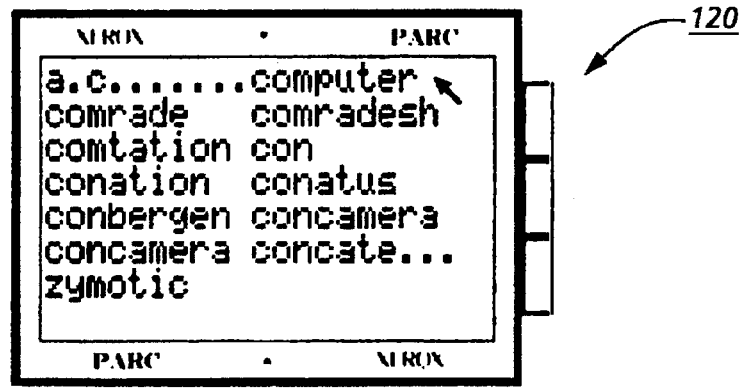
Figure 14:
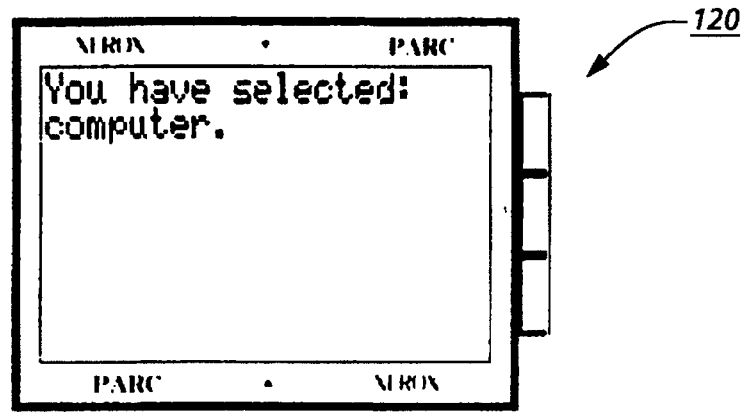

An example of a working application of the present invention is illustrated in FIGS. 6 through 9. A small, handheld processor based computer 120 with on-board memory and a user interface provided by pointer indicator 122 (mouse or touch sensitive screen controlled) is shown in those Figures. The computer 120 (known as the PARCTAB) can only display about 21 alphanumeric characters horizontally and eight alphanumeric characters vertically. In the Figures, the handheld computer 120 is being used to determine the location of an individual upon selection of that individual's name. The target name is "schilit". Since the name "schilit" is not displayed on the initial screen of FIG. 6, the pointer indicator 122 is maneuvered to select an ellipsis sited between names of individuals represented by the terms "preas" and "shenker". After this selection, the screen is rewritten as illustrated in FIG. 7. The desired name (that of the present inventor "schilit") is selected, and the screen is rewritten as illustrated in FIG. 8 to display information about the location of "schilit" in room 2101 of Xerox PARC, along with the appropriate time and date.

Note that at any point in the selection process it is possible to move back up the tree by selection of an appropriate ellipsis, as well as down to the target name. For example, in FIG. 7, the first item in the list "atkinson" and its following ellipsis are present, as well as the last item in the list "wirish" and its preceding ellipsis. Selection of either ellipsis would cause the screen to rewrite and display the first level screen shown in FIG. 6. This feature enables a user to easily correct mistakes and move to other levels in the k-ary tree with little difficulty. The final screen shown in FIG. 8 illustrates the adaptive nature of the method and apparatus of the present invention, with the name "schilit" now appearing as a bracket member able to be selected on the initial screen presented to a user.

An alternative thesaurus application provides an indication of the power of the present invention for searching ordered lists with minimal display requirements and very few levels of search (search time being proportional to the log base k of the k-ary tree). As shown in FIGS. 10 through 14, a 29-thousand word thesaurus can be searched using the elision based method of the present invention to find the word "computer" in only four steps.

Figure 15A:
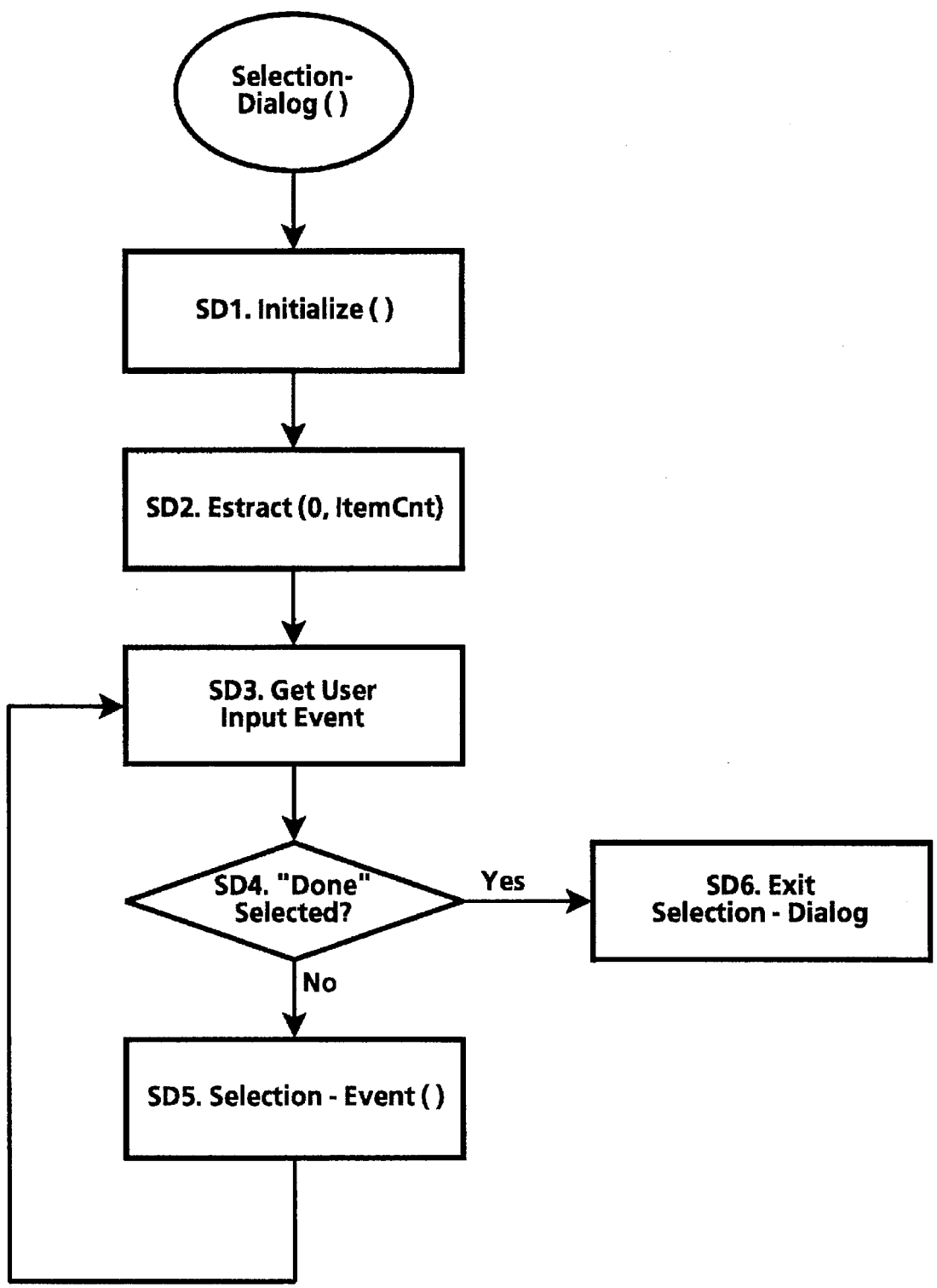
FIGS. 15a–15g are charts illustrating flow logic in accordance with the method of the present invention to adaptively organize and present ordered information on a small display.
Figure 15B:
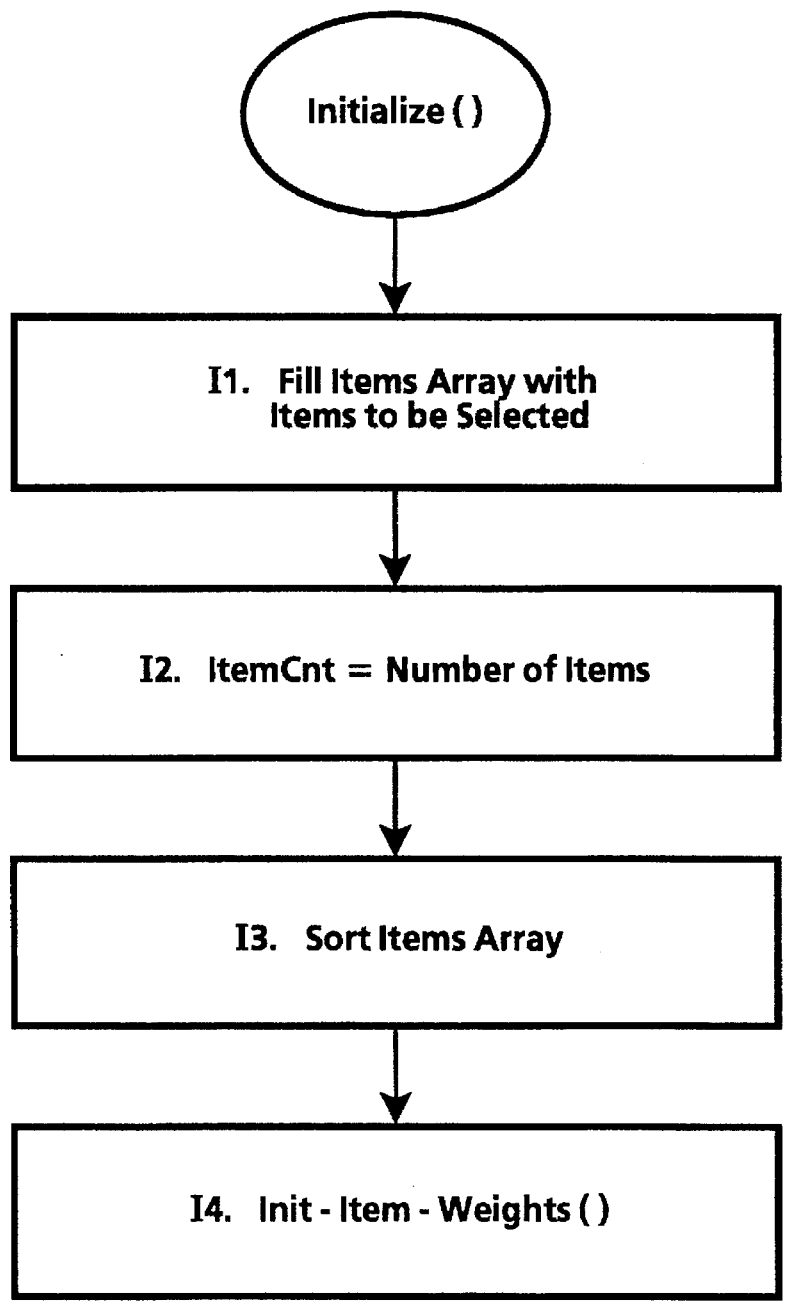
Figure 15C:
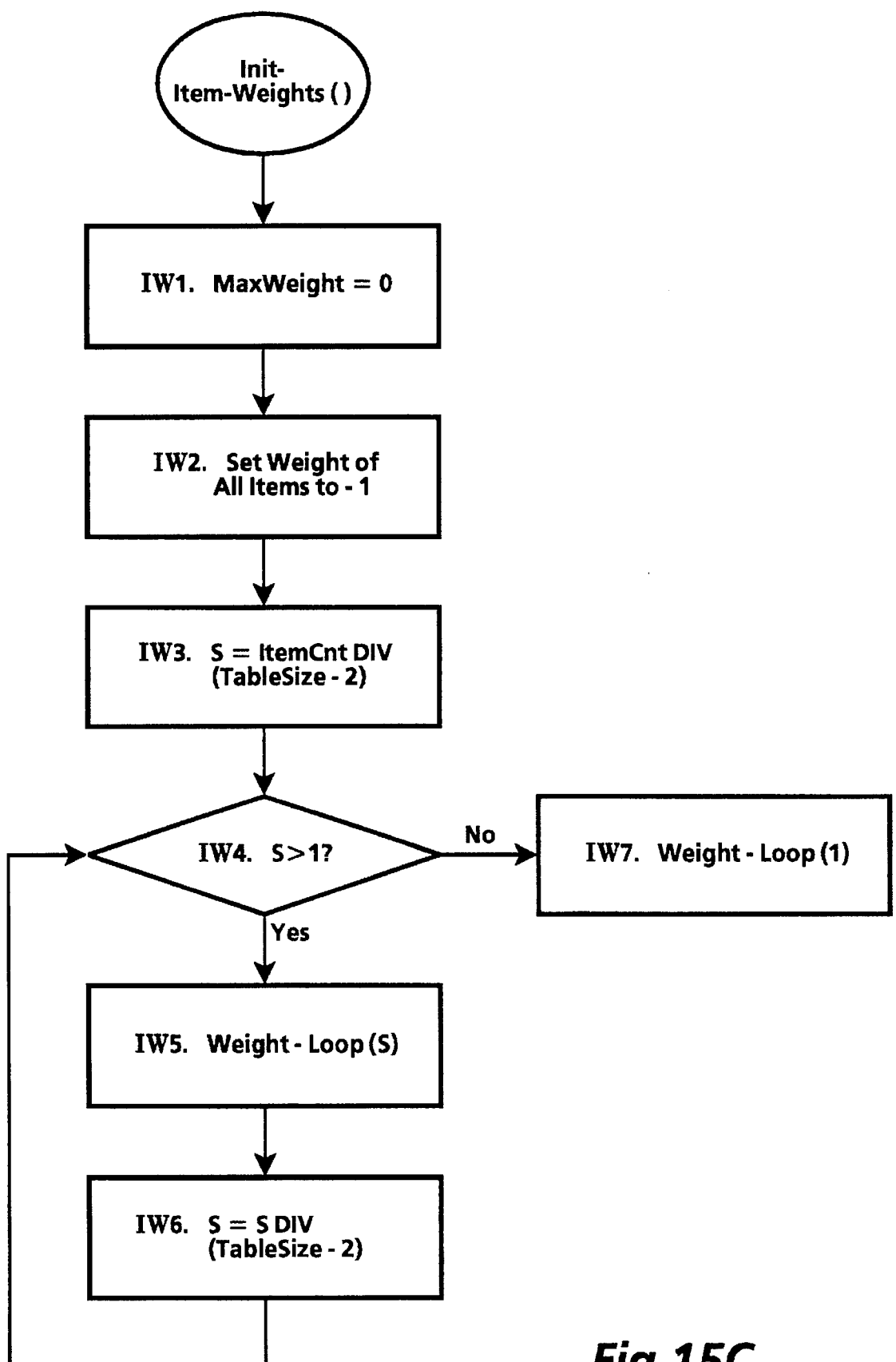
Figure 15D:
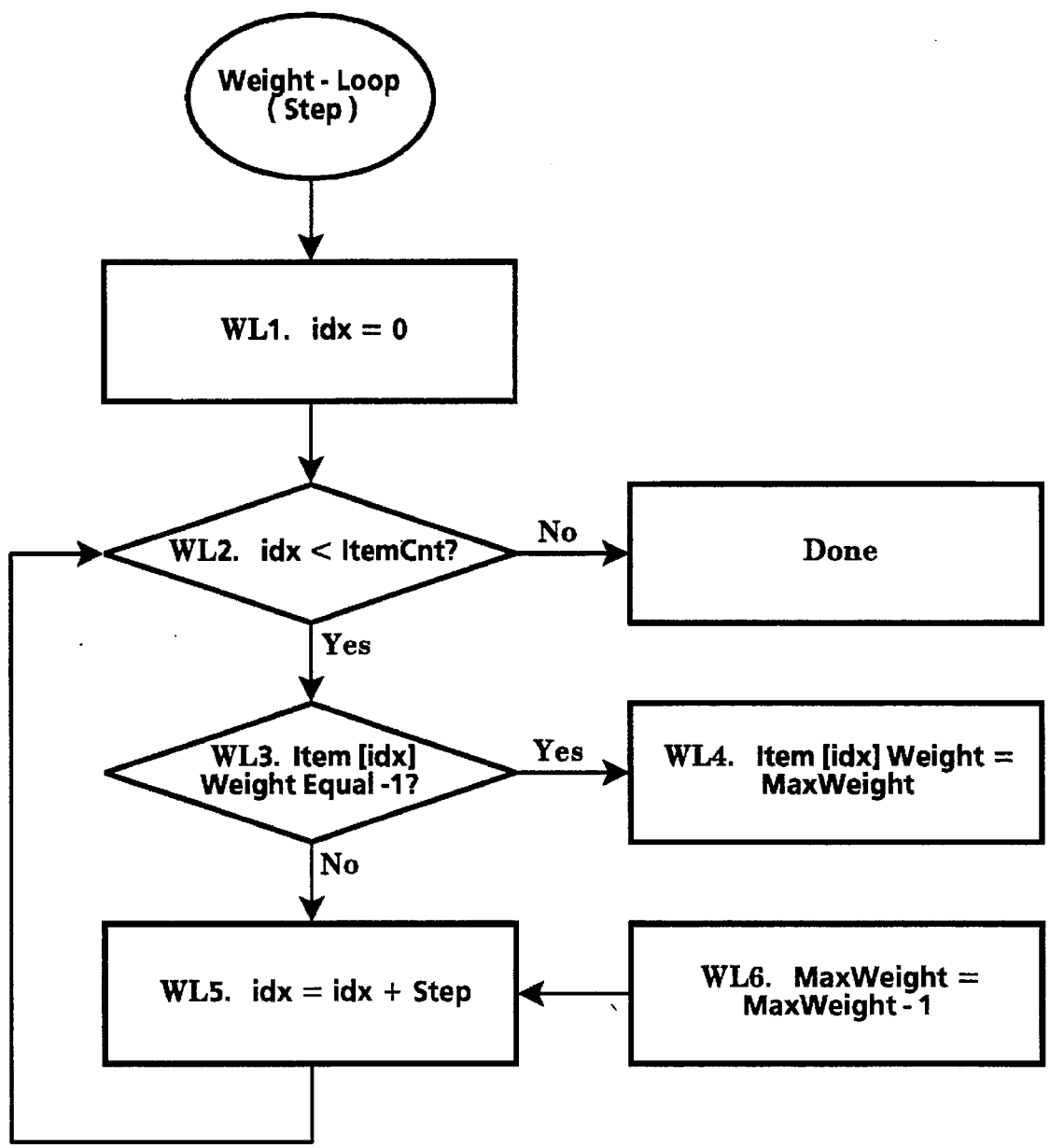

A flow chart illustrating the logic controlling presentation of data such as illustrated in FIGS. 6 through 14 is shown in FIGS. 15a through 15g. As shown in those Figures, FIG. 15a shows the top-level flow chart logic called "Selection-Dialog" comprising steps SD1 through SD6. This flow chart fragment initializes the collection of members (SD1) (e.g., words, phrases, numbers), extracts the bracket members (SD2), and repeatedly processes user input (SD3–SD6). FIG. 15b shows the flow chart logic called "initialize" comprising steps I1 through I4. The collection of members (e.g., words, phrases, numbers) is first read into the array called "Items" (I1); the number of members is recorded in ItemCnt (I2); and the array is sorted (I3) and weights are assigned to members to facilitate choosing bracket members (I4). FIGS. 15c and 15d show the flow chart logic called "InitItem-Weights" comprising steps IW1 through IW7 and "Weight-Loop" comprising steps WL1 through WL6. The purpose of these steps is to initialize the integer weight values for each members. Weight values serve the following purpose: for any subset of members, extracting the N members with the highest weights will provide the N bracket members required for the selection procedure. Steps IW1 through IW7 evenly spread the high value weights within the Items array. This causes the size of the elided regions to start out even. For example, with 72 entries the weights are distributed as follows: 72 57 56 55 54 71 53 52 51 50 70 49 48 47 46 69 45 44 43 42 68 41 40 39 38 67 37 36 35 34 66 33 32 31 30 65 29 28 27 26 64 25 24 23 22 63 21 20 19 18 62 17 16 15 14 61 13 12 11 10 60 9 8 7 6 59 5 4 3 2 58 1.

Figure 15E:
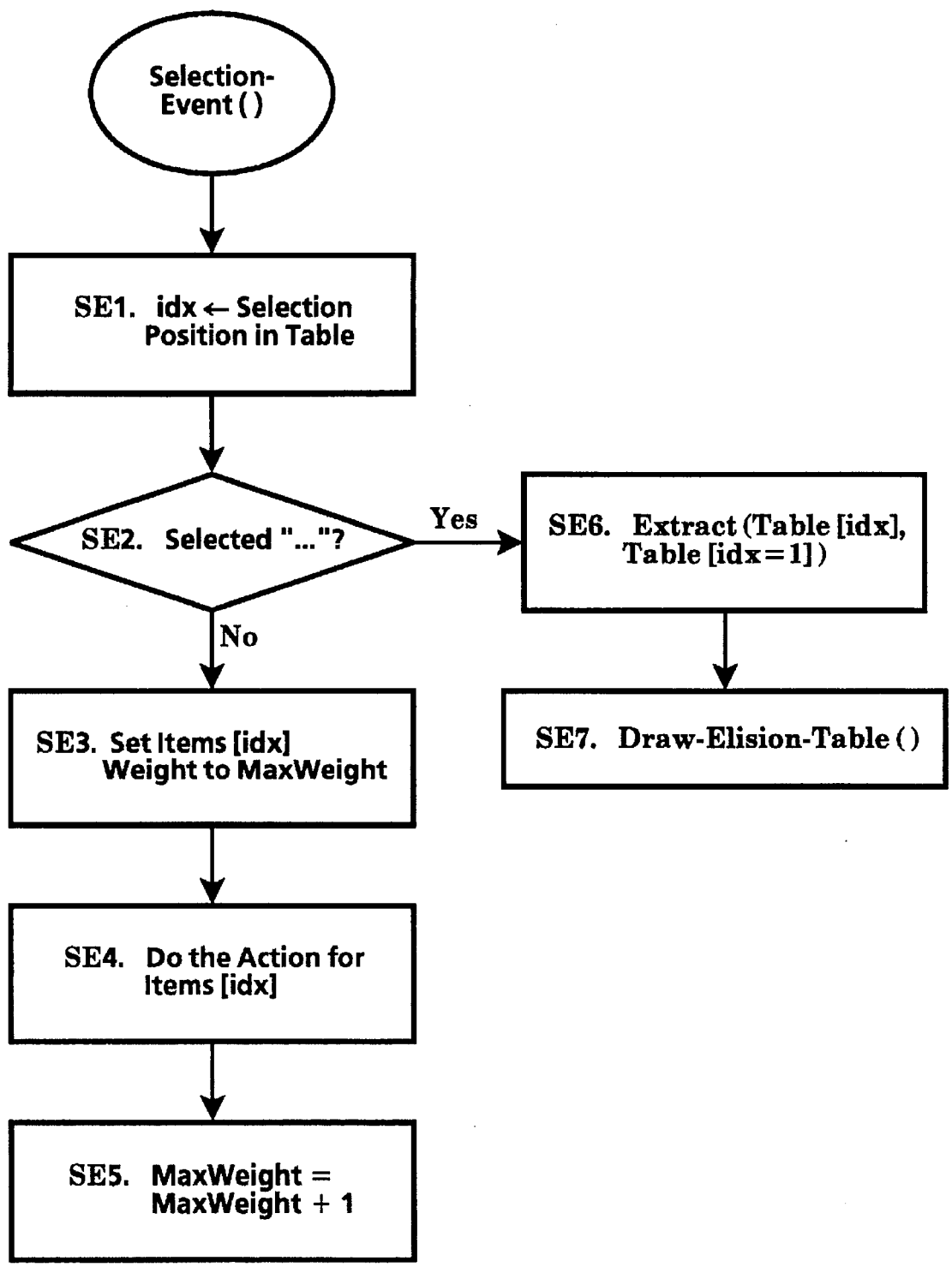
Figure 15F:
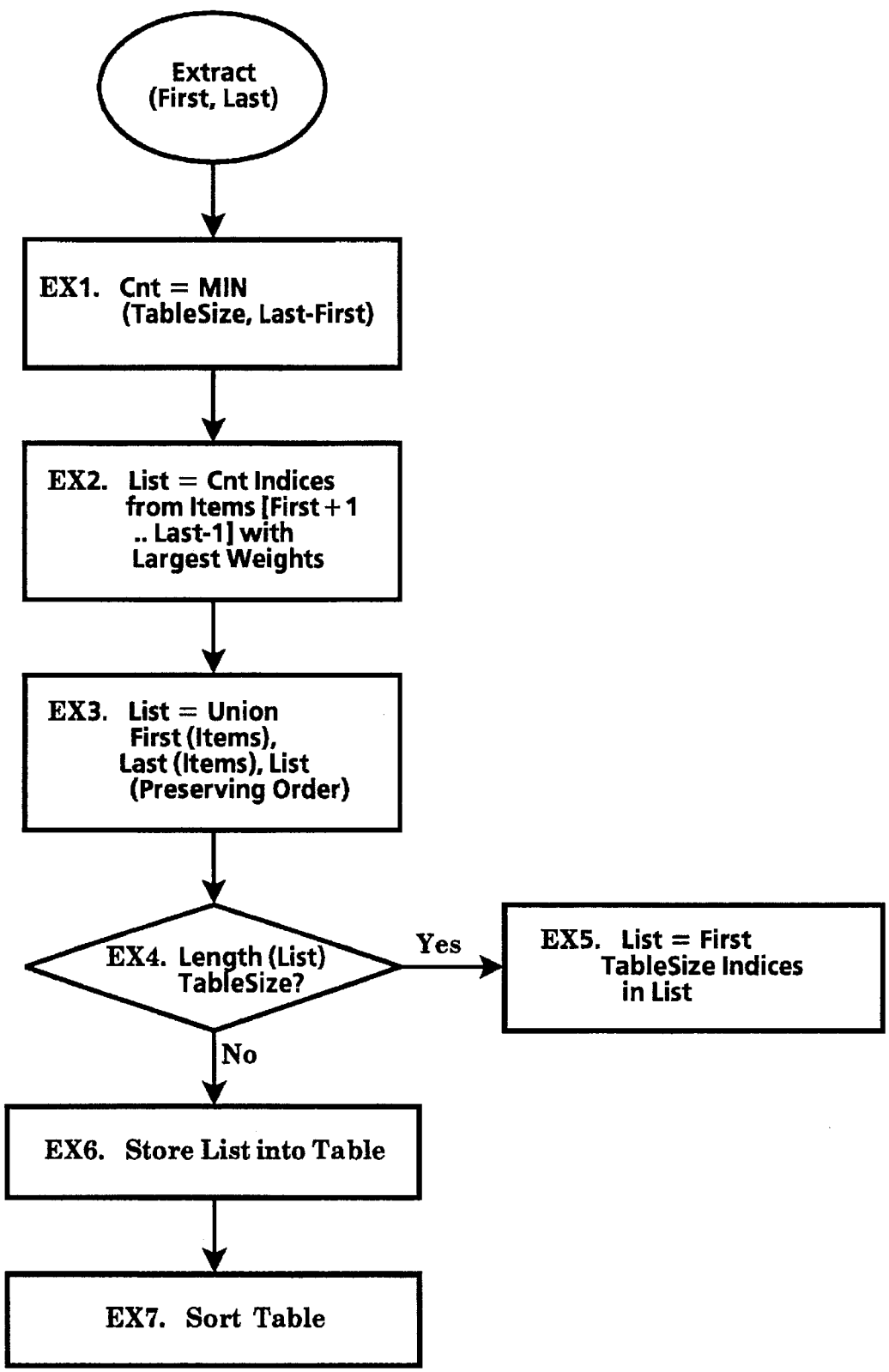
Figure 15G:
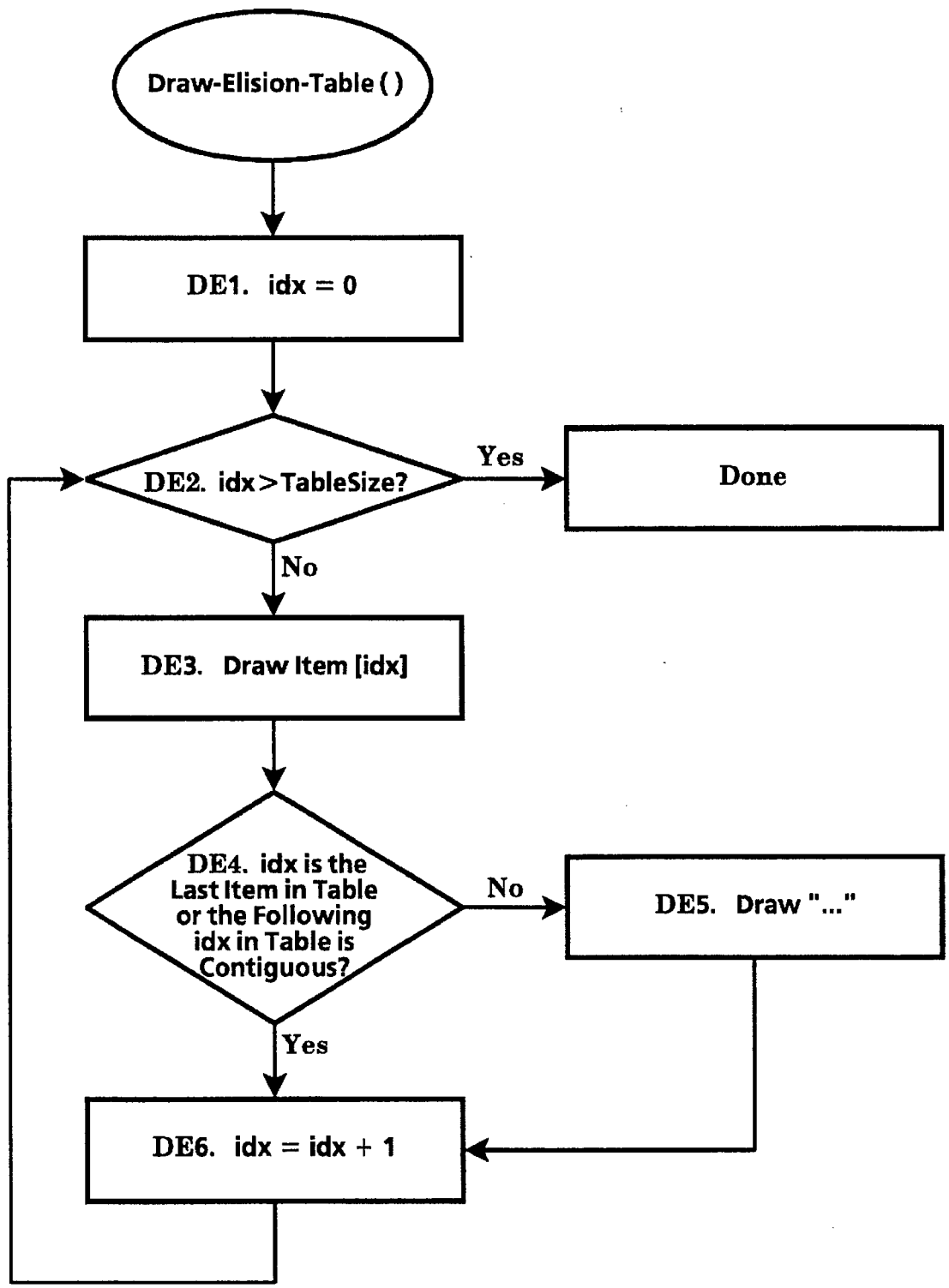

FIG. 15e shows the flow chart logic called "Selection-Event" comprising steps SE1 through SE7. Selection-Event handles user input during the dialog if the user selects an item (bracket member) then does the action for that item (SE4). If the user selects the elision ". . ." between two items (bracket members), the display is redrawn to show members contained within range of the bracket members (SE6–SE7). FIG. 15f shows the flow chart logic called "Extract" comprising steps EX1 through EX7. Extract is invoked with a "first" and "last" index into the Items array representing the elided range of items(members) that currently comprise the user's focus. The object of Extract is to select new bracket members and store them into a Table to later show to the user. Step EX1 determines how many items will be in Table. Step EX2 stores in a temporary set called List the most significant items in the selected range. Step EX3–EX5 makes sure that the first and last members are present in List to facilitate navigation. Finally the bracket members are stored into Table (EX6)and sorted (EX7). FIG. 15g shows the flow chart logic called "Draw-Elision-Table" comprising steps DE1 through DE6. This flow chart presents the contents of the array Table (filled in by Extract) to the user. All members in Table are printed (DE3) and if two members bracket a non-empty range of members then these missing members are shown by drawing an elision (". . .") (DE5).

Figure 16:
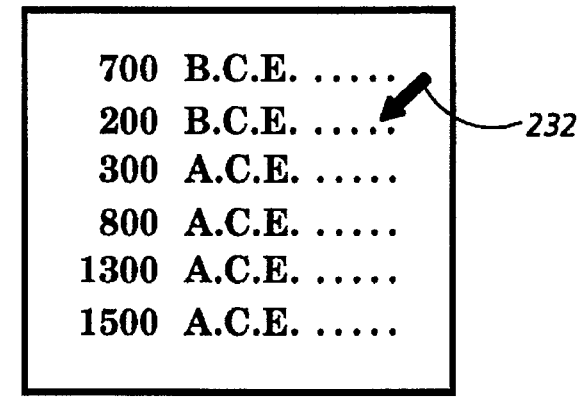
FIGS. 16 and 17 respectively illustrate example screens having ordered chronological information, with a first level screen displayed In FIG. 16 and the second level screen display after selection of the indicated ellipsis in FIG. 16 shown in FIG. 17.
Figure 17:
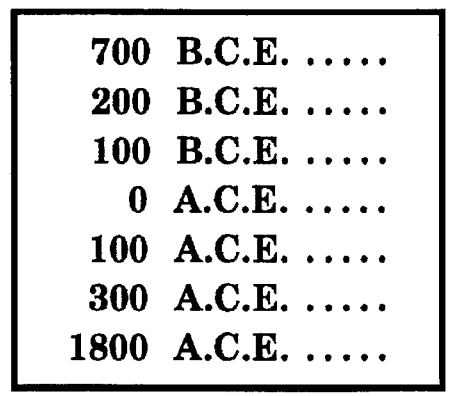

As will be appreciated by those skilled in the art, not only textual material can constitute the ordered data searchable by the method of the present invention. For example, FIGS. 16 and 17 respectively illustrate example screens having ordered chronological information (such as a history time table) in years before common era (BCE) or after common era (ACE). A first level screen is displayed In FIG. 16 and the second level screen display after selection of the indicated ellipsis in FIG. 16 shown in FIG. 17 for this example.

Figure 18:
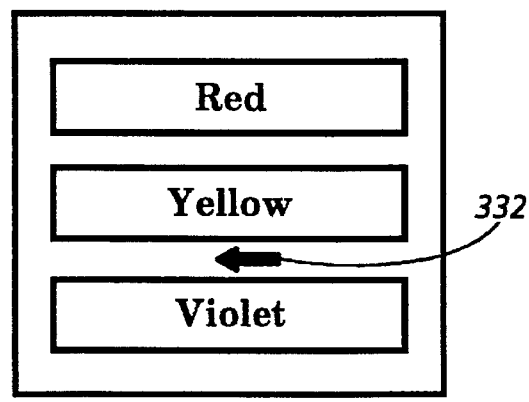
FIG. 18 and 19 respectively illustrate example screens display having ordered color information, with the first level screen displayed in FIG. 18, and the second level screen after selection of the indicated box representing a collective omitted color data symbol in FIG. 18 being shown in FIG. 19.
Figure 19:
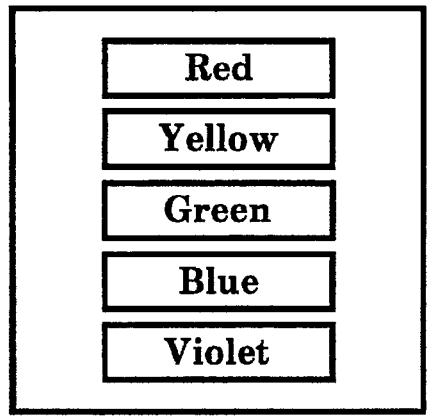

Alternatively, FIG. 18 and 19 respectively illustrate example screens display having ordered color information, with the first level screen displayed in FIG. 18, and the second level screen after selection of the indicated box representing a collective omitted color data symbol in FIG. 18 being shown in FIG. 19. This application enables a user to easily select any color in the spectrum, with the ordering information internally represented by light wavelength.

Figure 20:
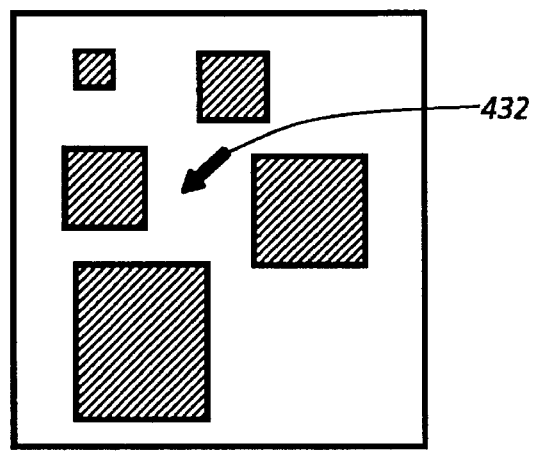
FIGS. 20 and 21 illustrate example screens having ordered area information, with the second level screen display after selection of a blank space in FIG. 20 being shown as FIG. 21.
Figure 21:
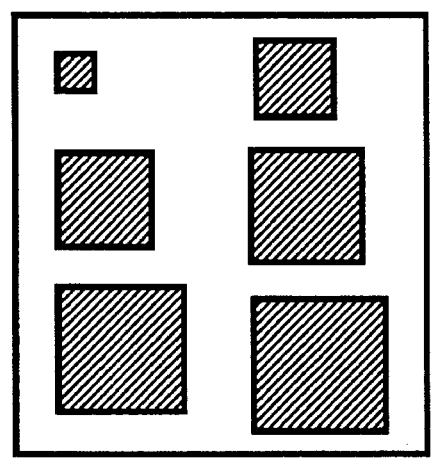

Finally, FIGS. 20 and 21 illustrate example screens having ordered area information, with the second level screen display after selection of a blank space in FIG. 20 being shown as FIG. 21. Differing size ranges can be selected with this particular application, which internally orders the data by areal size.

While the present invention has been described in conjunction with specific embodiments thereof, it is evident that many alternatives, modifications, and variations will be apparent to those skilled in the art. Accordingly, the various embodiments described herein should be considered illustrative, and not limiting the scope of the present invention as defined in the following claims.

The claimed invention is:

1. A method for accessing members of an ordered data set comprising the steps of
   dividing an ordered data set into multiple ordered subsets,
   designating at least one member of each ordered subset as a bracket member,
   referencing those members of each ordered subset not identified as bracket members with a collective data member symbol,
   displaying an ordered set of bracket members, with a collective data member symbol displayed between those bracket members separated from each other by two or more members in the ordered data set,
   repeating the foregoing steps upon user selection of the collective data member symbol, with those members of each ordered subset not identified as bracket members, and arranged between a respective pair of bracket members, constituting an ordered data set capable of being divided into multiple ordered subsets, and
   performing an operation upon user selection of one of the bracket members.

2. The method of claim 1, wherein the step of dividing an ordered data set further comprises the step of dividing the ordered set into multiple subsets, with each subset having approximately the same number of members.

3. The method of claim 1, wherein the step of designating at least one member of each ordered subset as a bracket member further comprises the step of preferentially selecting as bracket members those members of the data set determined likely to be selected to perform an operation by a user.

4. The method of claim 3, wherein the step of preferentially selecting bracket members further comprises the step of preferentially selecting as bracket members those members of the ordered data set last selected by a user.

5. The method of claim 3, wherein the step of preferentially selecting bracket members further comprises the step of preferentially selecting as bracket members those members of the ordered data set most frequently selected by a user.

6. The method of claim 3, wherein the step of preferentially selecting bracket members further comprises the step of preferentially selecting as bracket members user determined members of the ordered data set.

7. The method of claim 1, wherein the step of displaying an ordered set of bracket members further comprises display of an ellipsis as a collective data member symbol.

8. The method of claim 1, wherein the step of performing an operation upon user selection of one of the bracket members further comprises presenting information about the selected bracket member to a user.

9. The method of claim 1, wherein the ordered data set is alphabetically ordered text.

10. The method of claim 1, wherein the ordered data set is numerically ordered.

11. The method of claim 10, wherein the numerically ordered data set is chronologically ordered.

12. The method of claim 1, wherein the ordered data set represents discrete measurements of physical quantities.

13. The method of claim 12, wherein the discretely measured physical quantity is color.

14. The method of claim 1, further comprising the step of displaying the bracket members and collective data member symbols on a handheld screen display unit.

15. A recursive method for accessing members of an ordered data set comprising the steps of
    dividing an ordered data set into multiple ordered subsets,
    designating at least one member of each ordered subset as a bracket member,
    referencing those members of each ordered subset not identified as bracket members with a collective data member symbol,
    displaying an ordered set of bracket members, with a collective data member symbol displayed between those bracket members separated from each other by two or more members in the ordered data set, and
    performing an operation upon user selection of one of the bracket members.

16. The recursive method of claim 15 further comprising the steps of
    sequentially repeating the steps of dividing, designating, referencing, and displaying in response to user selection of the collective data member symbol, using an ordered data set constituted from those members of the ordered data set initially represented by the collective data member symbol.

17. The method of claim 15, wherein the step of dividing an ordered data set further comprises the step of dividing the ordered set into multiple subsets, with each subset having approximately the same number of members.

18. The method of claim 15, wherein the step of designating at least one member of each ordered subset as a bracket member further comprises the step of preferentially selecting as bracket members those members of the data set determined likely to be selected to perform an operation by a user.

19. The method of claim 18, wherein the step of preferentially selecting bracket members further comprises the step of preferentially selecting as bracket members those members of the ordered data set last selected by a user.

20. The method of claim 18, wherein the step of preferentially selecting bracket members further comprises the step of preferentially selecting as bracket members those members of the ordered data set most frequently selected by a user.

21. The method of claim 18, wherein the step of preferentially selecting bracket members further comprises the step of preferentially selecting as bracket members user determined members of the ordered data set.

22. The method of claim 15, wherein the step of displaying an ordered set of bracket members further comprises display of an ellipsis as a collective data member symbol.

23. The method of claim 15, wherein the step of performing an operation upon user selection of one of the bracket members further comprises presenting information about the selected bracket member to a user.

24. An apparatus for accessing members of ordered data sets too large to permit individual display of each member within a predetermined display area, the apparatus comprising
    a display unit having a predetermined area configured to accommodate a defined number of representations of data members,
    a memory unit for storing ordered data and instruction data,
    a user input device for receiving signals indicating selection of a representation of a data member by a user,
    a processor connected to receive data from the user input device, the processor being further connected to the display unit to control display of representations of data members, and to the memory unit to access stored ordered data and instruction data, with the processor configured to execute instructions that provide for
    dividing an ordered data set stored in the memory unit into multiple ordered subsets,
    designating at least one member of each ordered subset as a bracket member,
    referencing those members of each ordered subset not identified as bracket members with a collective data member symbol,
    displaying on the display unit an ordered set of bracket members, with a collective data member symbol displayed between those bracket members separated from each other by two or more members in the ordered data set stored in the memory unit, and
    performing an operation in response to user selection of one of the bracket members with the user input device.

25. The apparatus of claim 24, wherein the collective data member symbol displayed on the display unit is an ellipsis.

26. The apparatus of claim 24, wherein the display unit is a touch sensitive screen and the user input device further comprises a combination of a pointer and a touch sensitive screen.

27. The apparatus of claim 24, wherein the display unit comprises an area of screen dimensioned to present an area less than about 25 square centimeters.

28. The apparatus of claim 27, wherein the display unit is handheld.

29. A recursive method for operating on an ordered data set comprising the steps of
    designating at least three members of an ordered set as bracket members,
    displaying an ordered set of bracket members, with a collective data member symbol displayed between those bracket members separated from each other by two or more members in the ordered data set,
    accepting user selection of one of a displayed bracket member or a displayed collective data member symbol,
    repeating the foregoing steps of designating, displaying, and accepting when the displayed collective data member symbol is selected by a user, with the ordered set taken to be members of the ordered set represented by the user selected collective data member symbol, and performing an operation upon user selection of one of the bracket members.

30. An apparatus for accessing members of ordered data sets too large to permit individual display of each member within a display area, the apparatus comprising a display unit configured to accommodate a defined number of representations of data members, a memory unit for storing ordered data and instruction data, a user input device for receiving signals indicating selection of a representation of a data member by a user, a processor connected to receive data from the user input device, the processor being further connected to the display unit to control display of representations of data members, and to the memory unit to access stored ordered data and instruction data, with the processor configured to execute instructions that provide for designating at least three members of an ordered set as bracket members, displaying on the display unit an ordered set of bracket members, with a collective data member symbol displayed on the display unit between those bracket members separated from each other by two or more members in the ordered data set, accepting user selection of at least one of a displayed bracket member and a displayed collective data member symbol, repeating the foregoing steps of designating, displaying, and accepting when the user input device signals selection of a particular displayed collective data member symbol, with the ordered set redefined to be those members of the ordered set represented by the user selected collective data member symbol, and performing an operation upon user selection of one of the bracket members.

31. The apparatus of claim 30, wherein the display unit is a touch sensitive screen and the user input device further comprises a combination of a pointer and a touch sensitive screen.

32. The apparatus of claim 31, wherein the display unit comprises an area of screen dimensioned to present an area less than about 25 square centimeters.

33. The apparatus of claim 32, wherein the display unit is handheld.

* * * * *